United States Patent

[11] 3,633,770

| [72] | Inventor | John Alban Howard<br>Bedford, England |
|---|---|---|
| [21] | Appl. No. | 855,841 |
| [22] | Filed | Sept. 8, 1969 |
| [45] | Patented | Jan. 11, 1972 |
| [73] | Assignee | Lever Brothers Company<br>New York, N.Y. |
| [32] | Priority | Sept. 9, 1968 |
| [33] | | Great Britain |
| [31] | | 42,881/68 |

[54] DEVICE FOR PASSING A PRODUCT BETWEEN ZONES OF DIFFERENT PRESSURE
2 Claims, 7 Drawing Figs.

[52] U.S. Cl..................................................... 214/17 B, 34/242
[51] Int. Cl................................................ B65g 47/82
[50] Field of Search........................................... 214/17.4, 31; 198/226; 34/242

[56] References Cited
UNITED STATES PATENTS

| 1,396,859 | 11/1921 | Long............................. | 214/17 (.4) |
| 1,875,921 | 9/1932 | Grant et al................... | 214/17 (.4) |
| 2,604,216 | 7/1952 | Martin.......................... | 214/17 (.4) |
| 2,906,417 | 9/1959 | Rossi............................ | 214/17 (.4) |

*Primary Examiner*—Robert G. Sheridan
*Attorneys*—Louis F. Kline, Jr., Melvin H. Kurtz and Edgar E. Ruff ABSTRACT: A device for transferring a product, such as food to be freeze-dried or puffed, between two zones of different pressure comprises a housing having an inlet and an outlet in communication with the respective zones, and also having a bore in which reciprocates a piston formed with a product-receiving pocket, at least two seals being provided between the piston and the bore, and located so that at least one seal is operative in any position of the piston reciprocation.

INVENTOR:
JOHN ALBAN HOWARD

BY
HIS ATTORNEY

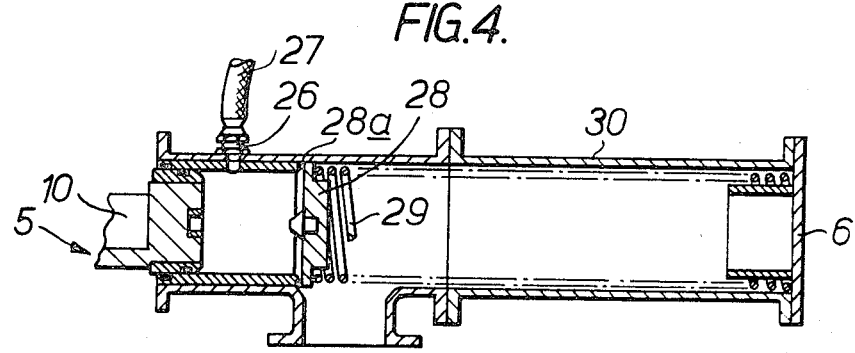
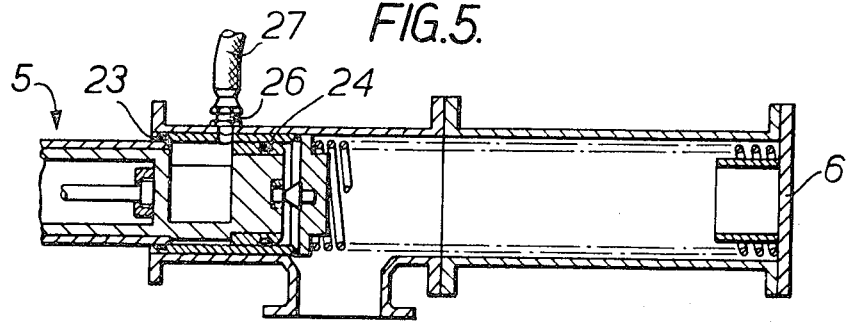
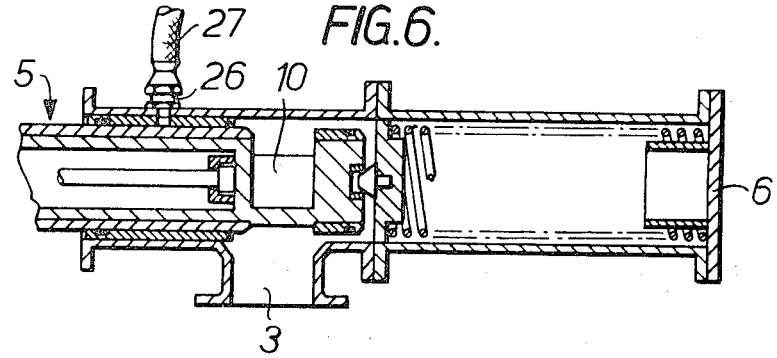
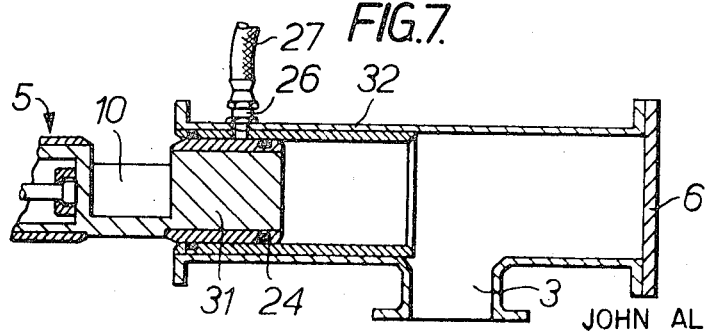

DEVICE FOR PASSING A PRODUCT BETWEEN ZONES OF DIFFERENT PRESSURE

This invention relates to a feeding device and particularly a device for passing a product between zones of different pressure, for example, in freeze-drying or other differential pressure treatment of foodstuffs such as puffing.

The treatment of products is commonly carried out in closed chambers at pressures above or below atmospheric pressure. To provide a continuous process it is required to feed the product to and from the chamber whilst allowing a minimum of deviation of the pressure within the chamber and without substantially increasing the demands on the equipment maintaining the chamber at the required pressure and thereby increasing the operating costs of the treatment process.

According to the present invention there is provided a device for passing a product between zones of different pressure comprising a housing having an inlet and an outlet adapted to be connected respectively with the different zones, and having a bore within which a product carrier in the form of a piston assembly is arranged to reciprocate to carry product from the inlet to the outlet, and at least two pressure-retaining seals between the product carrier and the bore of the housing, the seals being arranged so that at all positions in the stroke of the product carrier between the inlet and the outlet at least one of the seals provides a pressure seal between the inlet and the outlet.

The product carrier can comprise a pocket formed in the sidewall of the piston assembly. The product is preferably carried wholly within the piston assembly so that the product does not come into direct contact with the bore of the housing or with any of the pressure-retaining seals.

The product can be gravity-fed to the product carrier when the product carrier is at the inlet position; the device can comprise means for rotating the product carrier within the housing when the product carrier is at the outlet position so that the product is discharged from the carrier by gravity.

A pump connection can be located in the housing between the inlet and the outlet and adapted to be connected to pumping means whereby the pressure in the product carrier can be adjusted when the product carrier is in an intermediate position between the inlet and the outlet with the said seals providing pressure seals between the product carrier and the inlet and the outlet.

For example, when the device is passing a product between a zone at atmospheric pressure and a zone at a higher (or lower) pressure, the pumping means would be arranged to adjust the pressure in the product carrier to approach or more nearly approach the higher (or lower) pressure as the product carrier traveled towards the inlet or the outlet whichever is connected to the higher (or lower) pressure. Similarly, when the device is passing a product between two zones at pressures other than atmospheric pressure, the pressure in the product carrier can be adjusted toward the pressure obtaining at either the inlet or the outlet, or alternatively the pressure can be adjusted, on the respective strokes, toward the pressures obtaining at both the inlet and the outlet.

The device can advantageously be adapted so that the pump connection is isolated from the inlet and/or outlet connection, either by arranging the piston assembly so that the pump connection is not uncovered, or by providing a sealing member adapted to seal the pump connection from the inlet or outlet when the piston assembly uncovers the pump connection. This is desirable when the pumping means would otherwise be in direct communication with either a zone at atmospheric pressure or with a zone at a pressure which the pump is not cable of achieving, either of which circumstance should preferably be avoided to minimize wear and tear on the pumping means.

The invention will now be more particularly described with reference to the accompanying diagrammatic drawings in which.

Figure 2:
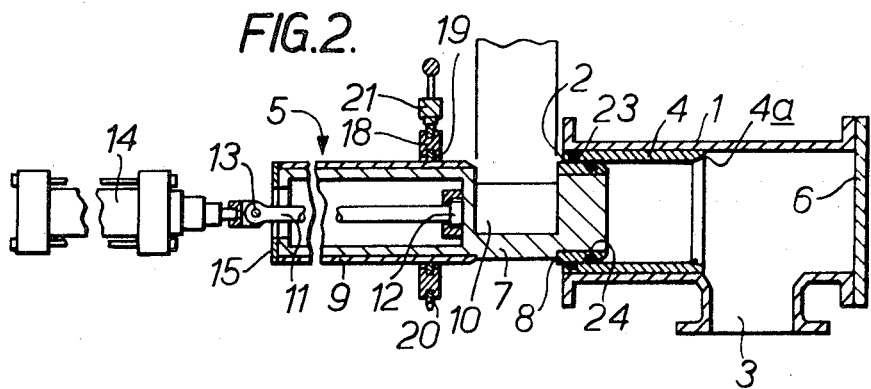
FIG. 2 is a sectional elevation of the device of FIG. 1 along the line II—II.

FIGS. 4, 5, and 6 are sectional elevations similar to FIG. 2 showing an alternative arrangement, the operating mechanism being omitted, and FIG. 7 is a sectional elevation showing a further arrangement.

Figure 1:
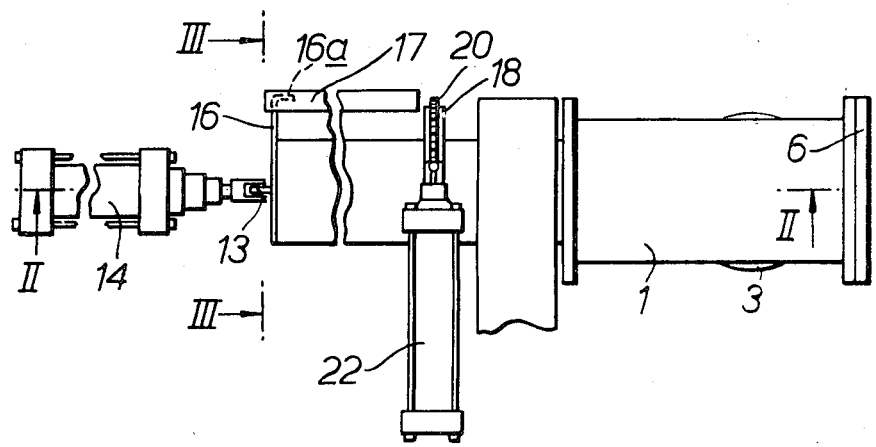
FIG. 1 is a plan view of a device according to the present invention.
Figure 3:
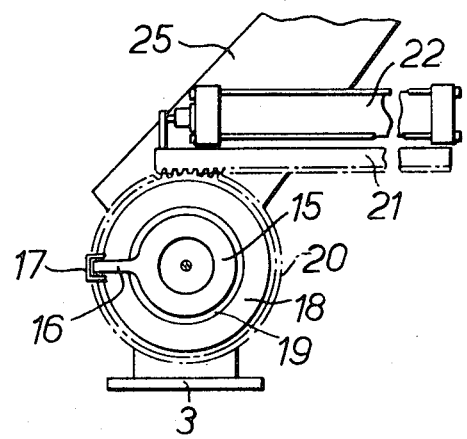
FIG. 3 is a a sectional end elevation on the line III—III in FIG. 1.

Referring to FIGS. 1 to 3 a device suitable for feeding product to a freeze-drying chamber, comprises a housing 1 having an inlet opening 2 and an outlet 3. Located within the housing is a liner 4 of a self-lubricating nylon material which forms the bore of the housing and within which a piston assembly denoted generally by 5 can move. The end of the housing opposite the inlet 2 is closed by a cover plate 6, which can be removed for maintenance purposes.

The piston assembly 5 comprises a generally cylindrical body portion 7 provided at 8 and 9 with outer sleeves of a self-lubricating nylon material. Between the two sleeves is a pocket 10 formed in the sidewall of the body portion of the piston assembly to provide a product carrier. An operating rod 11 is connected at one end 12 to the body portion, the other end 13 of the rod being connected to a pneumatic-operating cylinder 14. Secured to the end of the body portion 7 is an annular member 15 having a tongue 16 extending outwardly therefrom into engagement with a slide 17, the tongue having a portion 16a extending in the direction of movement of the body.

An annular ring 18 is carried on a supporting frame (not shown) and carries on its inner surface an annular bearing 19 of self-lubricating nylon material and on its outer surface an annular gear ring 20. A rack 21 is in engagement with the annular gear ring 20, the rack being connected to a pneumatic-operating cylinder 22.

Two pressure seals 23 and 24 are arranged between the bore of the housing and the piston assembly, the seal 23 being located in a groove formed in the liner 4 and the seal 24 being located in a groove formed in the sleeve 8. The seals are arranged so that they do not cross one another as the pocket 10 reciprocates between the inlet and outlet positions. The relative dimensions of the pocket, the length of the liner 4 and the positions of the seals 23 and 24 are arranged so that at all positions of the product carrier between the inlet and the outlet at least one of the seals provides a pressure seal between the inlet and the outlet. As the pocket approaches the outlet the seal 24 leaves the liner 4, the liner is therefore relieved at 4a to facilitate the seal reentering the liner.

In operation a food product passes down a chute 25 into the pocket 10 of the piston assembly. The piston is then moved by the operating cylinder 14 so that the pocket enters the housing. Before the seal 24 leaves the liner 4 the seal 23 engages with the sleeve 9 so that at least one of the seals is effective between the inlet and outlet of the housing. As the pocket approaches the outlet the forwardly projecting portion 16a of the tongue 16 engages between two of the teeth of the annular gear ring 20 so that operation of the cylinder 22 effects rotary movement of the piston assembly through 180° to empty the food product from the product carrier through the outlet. The piston assembly is then rotated back through 180° before commencing the return stroke back to the position where the pocket is below the chute 25.

In the modified arrangement shown in FIGS. 4 to 6 a pump connection 26 is provided in the housing between the inlet and outlet and which can be connect to vacuum-pumping means (not shown) by means of a pipe 27. A sealing member 28 is urged by a spring 29 into engagement with the liner 4, an O-ring 28a being located in the annular end face of the liner so that the member 28 is urged into sealing engagement with the liner. The housing is provided with an extension 30 to accommodate the spring 29.

As the pocket is moved from the inlet position as shown in FIG. 4 to the outlet position as shown in FIG. 6, the pocket passes through an intermediate position as shown in FIG. 5 in which the pocket is sealed from the inlet by the seal 23 and from the outlet by the seal 24. In this intermediate position the pumping means is in communication with the pocket and reduces the pressure in the pocket to a pressure approaching that obtaining at the outlet of the hosing, i.e., the pressure in the freeze-drying chamber. Thus the amount of ambient air introduced into the freeze-drying chamber is minimized with a consequent reduction of the load on the vapor removal equipment and pumping means of the freeze-drying chamber.

Since it may not be convenient or economical to connect the connection 26 to pumping means capable of pumping down to the low pressure of about 1 torr obtained in the freeze-drying chamber, the sealing member 28 is arranged to isolate the connection 26 from the outlet as the piston assembly moves to the inlet position. For example, the connection 26 can be connected to a gas ballast pump capable of reducing the pressure in the product carrier down to about 10 to 20 torr as it passes through the intermediate position.

In the arrangement shown in FIG. 7 the piston assembly has been extended at 31 and the length of the housing increased at 32 between the inlet and the outlet so that the seal 24 does not traverse the pump connection 26. Thus when the piston assembly is in the inlet position as shown the seal 24 isolates the pump connection from the outlet in the same way as does the sealing member 28 in the arrangement shown in FIGS. 4 to 6.

A device according to the present invention can be used to discharge the product from a freeze-drying chamber. In this case the pump connection is advantageously employed to reduce the pressure in the empty product carrier on the return stroke of the piston assembly.

Again, a device according to the present invention can be used for passing a product to or from a zone above atmospheric pressure, in which case the pump connection can advantageously be connected to pumping means to increase the pressure in the product carrier as it passes through the intermediate position.

What is claimed is:

1. A device for transferring a product between two zones which are at different pressure, comprising a housing having an internal bore formed with an inlet spaced from an outlet, and with said inlet and outlet in communication each with one of said zones, a piston assembly slidable in said bore and formed with a product-carrying pocket, means for loading product into the pocket, means for reciprocating the piston assembly in said bore for the pocket to be placed alternately in communication with the inlet and the outlet of the housing, means for rotating the piston assembly in the housing bore, and about the axis of said bore, when the piston assembly is located with the pocket therein in communication with the outlet of the housing, two pressuretight seals between the piston assembly and the housing bore, located for at least one of said seals to be operative intermediate the inlet and the outlet in any position of the reciprocation of the piston assembly in the housing bore, and a pump connection in the housing, located to have communication with the pocket in the reciprocable piston assembly when the pocket is in an intermediate position between the inlet and the outlet of the housing, said pump connection being connectable with pumping means for adjusting the pressure in said pocket, the pump connection also being located in relation to the seals such that a pressuretight seal exists between the pump connection and the outlet when the pocket is in the inlet position.

2. A device for transferring a product between two zones which are at different pressure, comprising a housing having an internal bore formed with an inlet spaced from an outlet, and with said inlet and outlet in communication each with one of said zones, a piston assembly slidable in said bore and formed with a product-carrying pocket, means for loading product into the pocket, means for reciprocating the piston assembly in said bore for the pocket to be placed alternately in communication with the inlet and the outlet of the housing, means for rotating the piston assembly in the housing bore, and about the axis of said bore, when the piston assembly is located with the pocket therein in communication with the outlet of the housing, and a pump connection in the housing, located to have communication with the pocket in the reciprocable piston assembly when the pocket is in an intermediate position between the inlet and the outlet of the housing, and sealing means for establishing a pressuretight seal intermediate the pump connection in the housing that the housing outlet, further sealing means comprising a plug member adapted to engage with one end of the piston assembly, spring means biasing said plug member in the axial direction of the housing bore, an O-ring located in said bore intermediate the pump connection and the outlet for engagement by the plug member to isolate the housing outlet form the pump connection, the plug member being engaged and moved away from the O-ring by the piston assembly during its reciprocation towards the outlet.

* * * * *